(12) United States Patent
Fell, III et al.

(10) Patent No.: US 6,928,560 B1
(45) Date of Patent: Aug. 9, 2005

(54) DISTRIBUTED POWER CONTROL SYSTEM

(75) Inventors: Joseph H. Fell, III, East Fallowfield, PA (US); William Weil, Norristown, PA (US); Keith Mease, Gibbstown, NJ (US); Gregory Corban, Cambridge, MN (US)

(73) Assignee: Unisys Corporation, Blue Bell, PA (US)

( * ) Notice: Subject to any disclaimer, the term of this patent is extended or adjusted under 35 U.S.C. 154(b) by 591 days.

(21) Appl. No.: 09/966,225

(22) Filed: Sep. 28, 2001

(51) Int. Cl.[7] .............................................. G06F 1/28
(52) U.S. Cl. ..................... 713/300; 713/340; 307/43; 363/147
(58) Field of Search ................................ 713/300, 324, 713/340; 307/43, 64; 361/86, 93.8; 363/147

(56) References Cited

U.S. PATENT DOCUMENTS 5,724,649 A * 3/1998 Cariou et al. ............... 455/132
5,834,856 A * 11/1998 Tavallaei et al. ............. 307/64
6,310,792 B1 * 10/2001 Drobnik ....................... 363/147

OTHER PUBLICATIONS

A7V133 User's Manual. ASUSTek Computer Inc.. Dec. 2000. pp. 61 & 78. (www.asus.com).

* cited by examiner

*Primary Examiner*—Thuan Du
(74) *Attorney, Agent, or Firm*—Mark T. Starr; Lise A. Rode; Nathan Cass (57) ABSTRACT

A computer system incorporates distributed power control. In particular, the computer system comprises a power supply for providing at least one voltage, a power distribution system, and N boards, or modules (where N>1) coupled to the power supply via the power distribution system. Each board comprises a voltage regulator, which receives the voltage from the power supply and provides a regulated voltage to the board, and a processor for controlling the voltage regulator for varying the regulated voltage.

18 Claims, 11 Drawing Sheets

DISTRIBUTED POWER CONTROL SYSTEM

FIELD OF THE INVENTION

This invention relates generally to multi-processor computer systems and, more particularly, to power distribution and control.

BACKGROUND OF THE INVENTION

Computer systems typically comprise a number of boards (also referred to as cards or modules) on which resides the electrical components such as processors, memory, application-specific integrated circuits, etc. In powering such systems, there is typically a power system comprising one, or more, power supplies and a power distribution system, or power bus, for coupling each of the boards to the power supplies. The latter provide a variety of different voltages used in the computer system, such as but not limited to +5 volts (V), +12V, −5V, −12V, 3.3V, 1.8V, 1.5V, 48V, etc. (It should also be noted that there may be supplementary power supplies for providing a certain level of redundancy for the power system.)

Typically, such a power system provides what is referred to as "central power control" of individual voltage levels for performing maintenance and trouble-shooting of the computer system. In other words, an individual voltage level, e.g., the +5 volt level, can be monitored and adjusted for the entire computer system (also referred to as a "domain"). Such monitoring or adjustment can occur either directly (e.g., via a knob on the respective power supply, or via a local system administration terminal) or indirectly (e.g., where the system administration terminal is located at a remote location and coupled to the computer system via, e.g., an intranet). Thus, e.g., it is possible to raise, or lower, a particular voltage level, e.g., +5V, to all the boards of the computer system at once.

SUMMARY OF THE INVENTION

We have observed that the power system for a computer system can be further improved by providing "distributed power control." In a distributed power control system, at least two boards of a computer system each comprise at least one voltage regulator, for providing a regulated voltage level to the board, and a processor for controlling the regulated voltage level to the board.

In an embodiment of the invention, a computer system comprises a power supply for providing at least one voltage, a power distribution system, and N boards, or modules (where N>1) coupled to the power supply via the power distribution system. Each board comprises a voltage regulator, which receives the voltage from the power supply and provides a regulated voltage to the board, and a processor for controlling the voltage regulator for varying the regulated voltage to the board.

DETAILED DESCRIPTION

Figure 1:
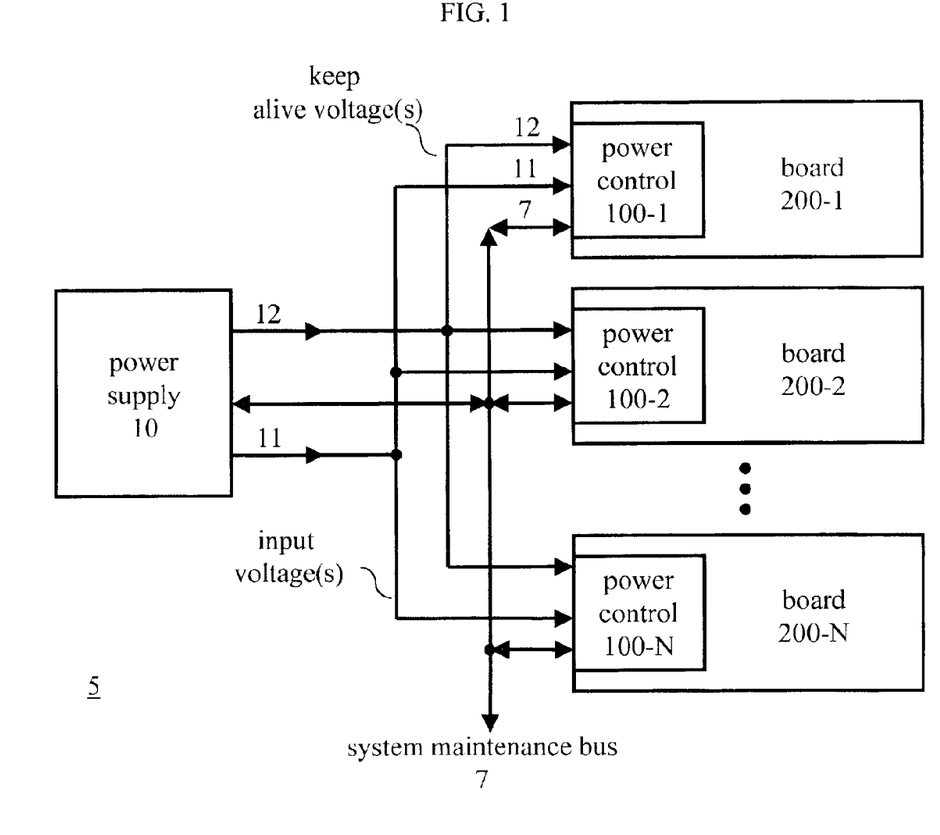
FIG. 1 shows an illustrative high-level block diagram of a portion of a server embodying the principles of the invention.

FIG. 1 shows an illustrative high-level block diagram of a portion, 5, of a server (computer system) embodying the principles of the invention (hereinafter referred to as server 5). Other than the inventive concept, the elements shown in FIG. 1 are well known and will not be described in detail. For example, a board (or module) comprises electrical components (not shown in FIG. 1) such as stored-program-control processors, memory, etc. Similarly, the power supply comprises electrical components (not shown in FIG. 1) such as transformers, etc. Power paths 11 and 12 are representative of any one of a number of forms of electrical coupling, e.g., a backplane, wire(s), wireless, etc. Also, the elements shown in FIG. 1 only relate to that portion of a server related to the inventive concept—as such, the functions each board provides, other boards, other backplanes and signaling interfaces, etc., are not described herein. (For example, server 5 may be a multi-processor system comprising at least 8 boards, where each board provides four high-performance 32-bit processors—the details of which are not related to the invention.)

As shown in FIG. 1, server 5 comprises a power supply 10 and a number of boards, N, as represented by boards 200-1, 200-2, . . . , 200-N. It should be noted that power supply 10 is merely representative of one, or more, power sources. Similarly, each board may provide different or identical functions, which, as noted above, are not described herein. (Indeed, each board may be physically different from the other boards in terms of size, shape, etc.) Each board is coupled to power supply 10 via power paths 11 and 12. Power path 11 conveys at least one "input voltage," e.g., +48V, from power supply 10 to boards 200-1, 200-2, . . . , 200-N. (The term "input" is relative to a board, e.g., board 200-1.) Power path 12 provides at least one input voltage, e.g., +12V, referred to herein as a "keep alive voltage" (described below) from power supply 10 to boards 200-1, 200-2, . . . , 200-N. Each board comprises a power control element, e.g., power control 100-1 of board 200-1. Although not apparent from FIG. 1, it is assumed that power path 12 provides operating power to each power control element, while power path 11 provides operating power to the remainder of each board. As described further below, boards 200-1, 200-2, . . . , 200-N provide "distributed power control." System maintenance bus 7 is coupled to all N boards and illustratively uses an Inter-IC ($I^2C$) signaling interface. Other examples of system maintenance bus 7 may be, but are not limited to: CAN (controller-area network) bus, SPI (SCSI-3 Parallel Interface)-SCSI (Small Computer System Interface) bus, USB (universal serial bus), other serial and parallel buses, etc. The $I^2C$ signaling interface is a known signaling interface and comprises a clock line and a bi-directional data line. The use of such a known signaling interface provides an open, common, interconnect to each of the N boards. It should be noted that in this embodiment system maintenance bus 7 is separate from other signaling buses of server 5. As further described below, this provides for fault tolerant operation but is not essential to the inventive concept, i.e., the signaling represented by system maintenance bus 7 could be a part of another signaling bus of server 5.

Figure 2:
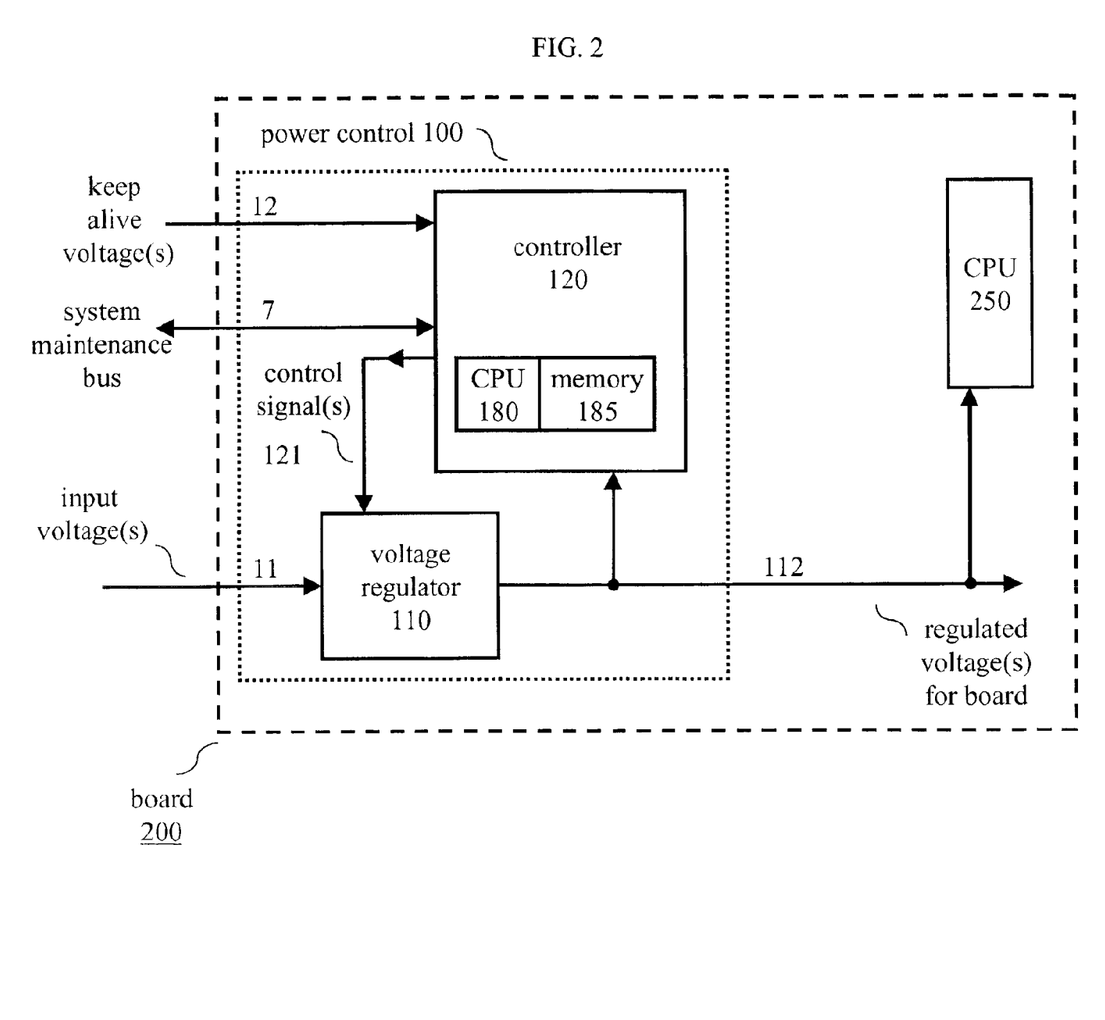
FIG. 2 shows an illustrative board, or module, in accordance with the principles of the invention, for use in the server of FIG. 1.

Boards 200-1, 200-2, . . . , 200-N are illustratively represented by board 200, which is shown in FIG. 2. Like FIG. 1, other than the inventive concept, the elements shown in FIG. 2 are well known and will not be described in detail (e.g., the controller is a PIC16LC774 available from Microchip). Board 200 comprises a power control element 100 and a remainder of the board, as represented by central processing unit (CPU) 250 (hereinafter the "remainder of the board" is simply referred to as "the board"). Power control element 100 comprises at least one DC (direct current)-to-DC voltage regulator 110 and a controller 120. The latter comprises a stored-program controlled processor as represented by CPU 180 and memory 185. Voltage regulator 110 receives the input voltage(s) via power path 11 and provides at least one regulated voltage to the board (e.g., CPU 250), via signal path 112. In other words, without the power provided via signal path 112—the board will not function. In contrast, power path 12 provides the keep alive voltage(s) to power control element 100—thus, power control element 100 has power to function even if no power is provided, via power path 11, to the board. (It should be noted, that the keep alive power may be controlled elsewhere in server 5, and, in fact, may be individually controlled for each power control element.)

As described further below, controller 120 monitors power-related parameters of board 200 and adjusts the operation of voltage regulator 110 in response thereto. For the purpose of this example, the power-related parameters are represented by the signal level(s) of the regulated voltage (s) conveyed on signal path 112. However, the inventive concept also applies to other types of power-related parameters. For example, temperature—which is related to the amount of power being dissipated by the board—may be monitored either directly from voltage regulator 110 (if the voltage regulator supports such a feature) and/or via a separate temperature sensing circuit (not shown). (Temperature sensing circuits are known in the art and not described herein.)

In the context of this example, controller 120 is coupled to signal path 112 for the purpose of monitoring the signal(s) conveyed thereon, and controls voltage regulator 110 via power path 121, which conveys at least one control signal. (For the purposes of this description, it is assumed that power path 121 is unidirectional. However, it should be noted that power path 121 could be bi-directional, e.g., additional status information may be provided from voltage regulator 110 to controller 120 for the purpose of conveying other power-related information such as, but not limited to, a current temperature level of voltage regulator 110, as mentioned above. Similarly, controller 120 may receive power-related information from other parts of board 200, e.g., a temperature sensor located at a position different from voltage regulator 110.)

Figure 3:
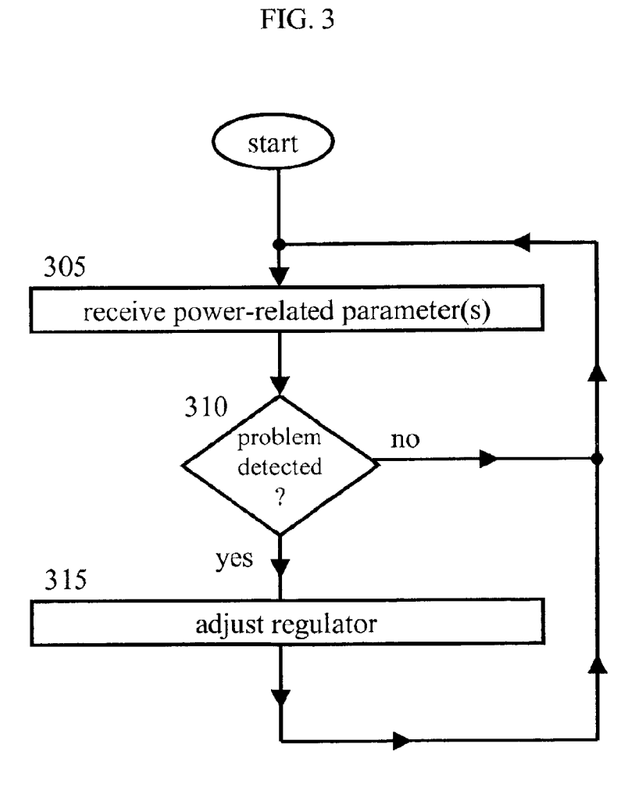
FIGS. 3 and 4 show illustrative flow charts in accordance with the principles of the invention.

Turning now to FIG. 3, an illustrative flow chart is shown in accordance with the principles of the invention. The inventive concept is implemented using conventional programming techniques, which as such, will not be described herein. In accordance with the flow chart of FIG. 3, controller 120 monitors power-related parameters of board 200 and, if necessary, controls voltage regulator 110 in response thereto. In particular, controller 120 executes steps 305 and 310 as long as a problem is not detected in step 310. However, once a problem is detected in step 310, controller 120 adjusts voltage regulator 110 in step 315 such as to ameliorate the detected problem.

For example, one power-related parameter is a regulated voltage level on signal path 112, and an illustrative problem is the regulated voltage level exceeding a predefined operating range. (The predefined operating range is either determined empirically and/or taken from data sheets for the various components used on board 200. For example, the predefined operating range may represent a guard band that is narrower than an operating range supported by the component data sheets.) As such, in the context of the flow chart of FIG. 3, if the regulated voltage level exceeds a predefined operating range (e.g., due to a variation in the effective impedance level, or load, presented by board 200) (steps 305 and 310), then controller 120 (in step 315) adjusts voltage regulator 110 in an attempt to keep the regulated voltage level within the predefined operating range. (Such variation over time of the load presented by board 200 may occur due to, e.g., the particular type of operation being performed by board 200 at any point in time, as well as the aging of the board components (devices) themselves over time.)

Figure 4:
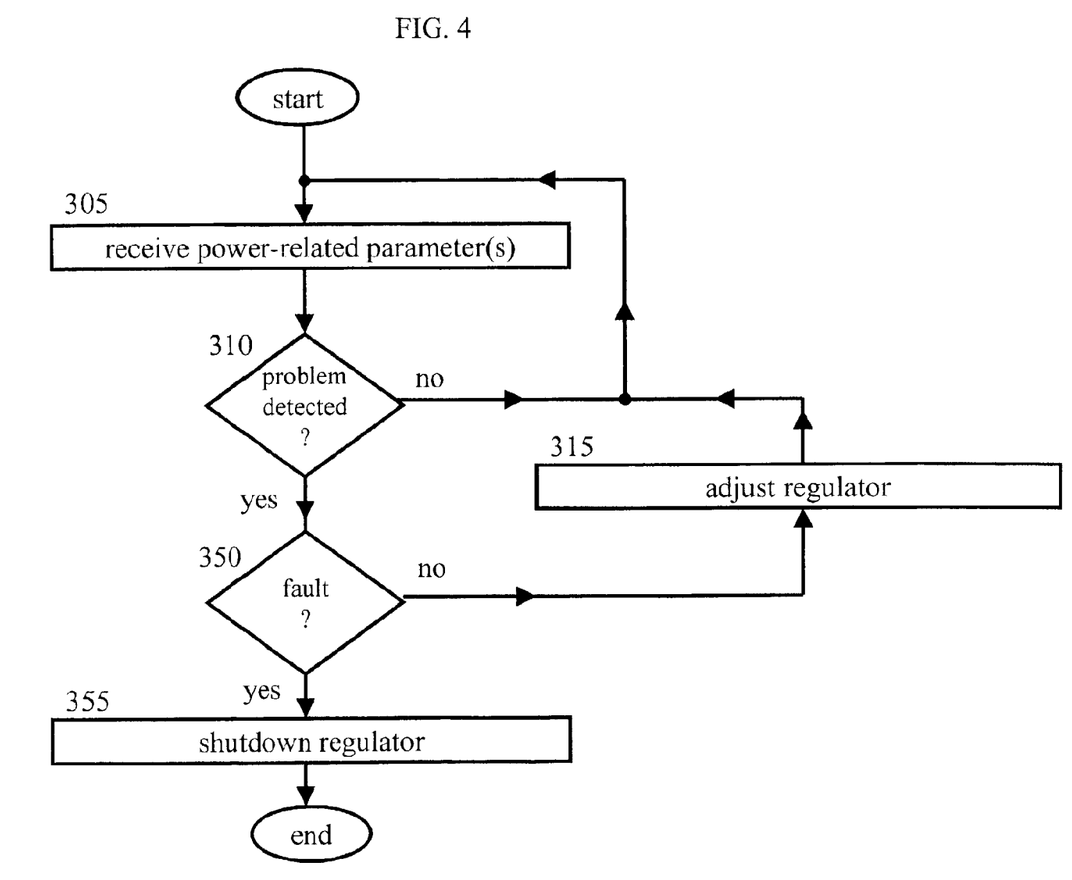

A variation of the flow chart of FIG. 3 is shown in FIG. 4. Like numbers represent similar steps and are not described further. In the flow chart of FIG. 4, steps 350 and 355 have been added. In particular, controller 120 tracks (e.g., via the use of state variables) whether a previously detected problem still exists, i.e., has a "fault" occurred. As such, in step 350, controller 120 determines if board 200 has a fault (this could either be the same problem as detected previously, or just the fact that some problem still exists). Controller can detect a fault in any number of ways. For example, by tracking if a problem exists, or is repeating, beyond a predefined amount of time; or simply counting when a number of subsequent passes through step 350 exceeds a predetermined value, K. (The value of K is predefined and is assumed to be determined empirically or by other system parameters.) Once a fault is declared, controller 120 executes step 355 rather than step 315 (which attempts to clear the problem detected in step 310). In step 355, controller 120 illustratively shuts down board 200 since, apparently, a problem state cannot be cleared. Thus, a computer system supporting distributed power control has the ability to selectively shutdown individual boards. (As will be described below, other forms of exception handling can be performed, e.g., generating an alert, etc.)

Figure 5:
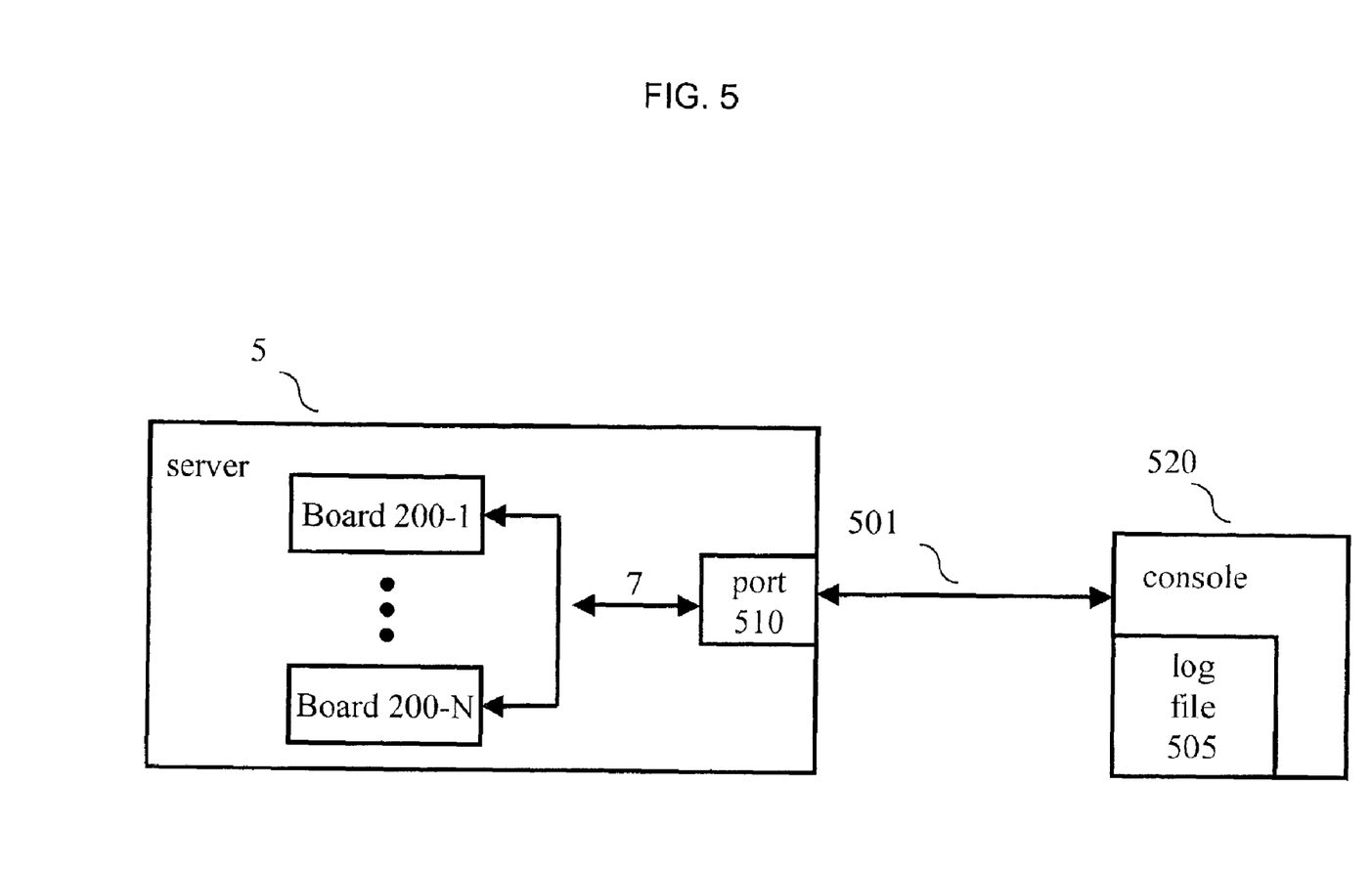
FIG. 5 shows an illustrative system arrangement embodying the principles of the invention.

As described above, and in accordance with the invention, each of the N boards has the ability to control the power distribution to itself—thus providing distributed power control for the server. Turning now to FIG. 5, another view of server 5 is shown illustrating another feature of the invention. Other than the inventive concept, the elements shown in FIG. 5 are well known and will not be described in detail. As noted above, and shown again in FIG. 5, each of the N boards, board 200-1 through 200-N, is coupled to system maintenance bus 7 (using the above-mentioned $I^2C$ signaling). System maintenance bus 7 is coupled to port 510 for coupling to a maintenance, or administration, console 520, via path 501. The latter is representative of any coupling method, e.g., a wired and/or wireless connection, for coupling a terminal to a computer system either locally (e.g., a direct connection) or remotely (e.g., a remote connection via the internet). Illustratively, port 510 converts the I2C signaling (used on system maintenance bus 7) to the IEEE 1149.1 Joint Task Action Group (JTAG) interface, known in the art. Console 520 is assumed to be an intelligent terminal, such as a personal computer, and provides for administration and maintenance of server 5. (An administration, or maintenance console, is also referred to as a Maintenance Instruction Processor (MIP).) Console 520 stores a log file 505 on a non-volatile memory (like a disk drive) (not shown). Log file 505 is assumed to be an ASCII (American Standard Code for Information Interchange) text file, but can be in any format. Periodically, maintenance processes (or applications) (not shown) executing on console 520 update (or write-to) log file 505 for tracking system events (e.g., a problem (or error)). In this context, and in accordance with a feature of the invention, the above-described controller of the respective boards (e.g., board 200 of FIG. 2) supporting distributed power control in server 5 are used to perform an illustrative maintenance process such as that shown in the flow chart of FIG. 6.

Figure 6:
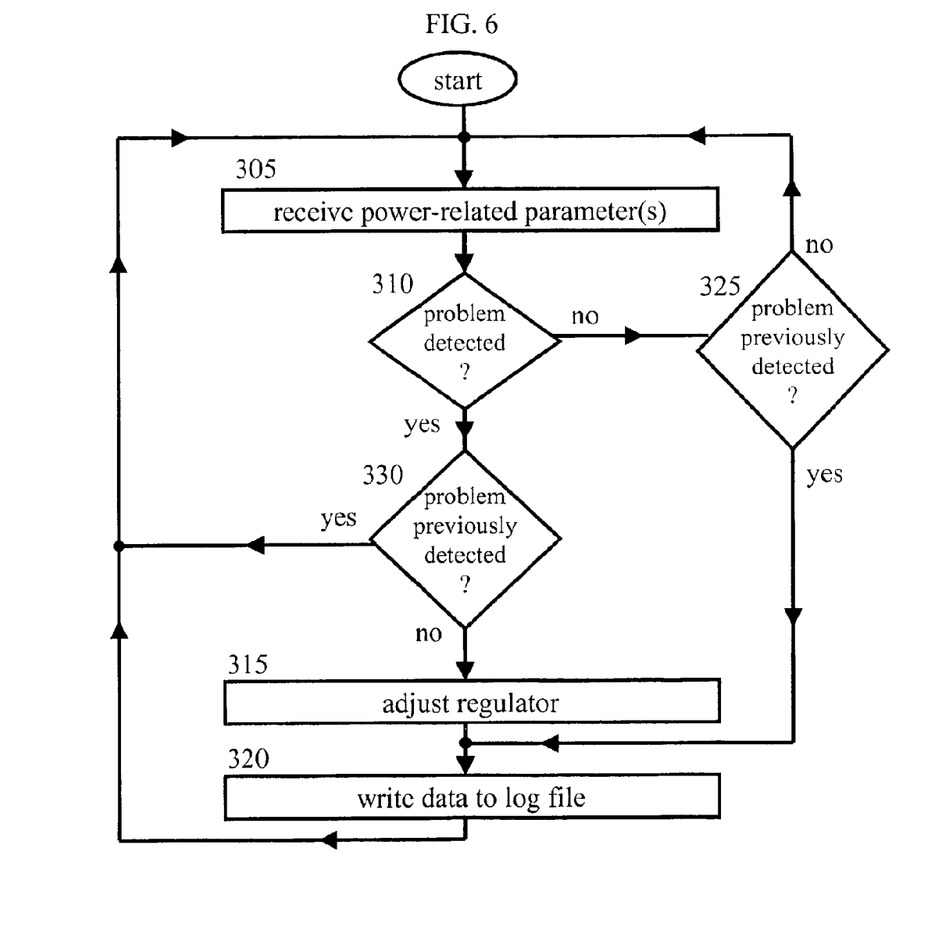
FIG. 6 shows another illustrative flow chart in accordance with the principles of the invention.

The flow chart of FIG. 6 is similar to the flow chart of FIG. 3 with the addition of steps 320, 325 and 330. Like numbers indicate like steps and are not described further. In step 320, controller 120 of FIG. 2 writes data to log file 505, where the data is representative of the detected problem. (This data is written using the above-mentioned I²C signaling interface, which is then converted to JTAG for transmission to console 520, as noted above. Information exchange, e.g., using I²C signaling, presumes a suitably formatted message set (not shown) for sending commands and receiving status information that may, or may not, include error detection and/or error correction. For example, a message comprises at least three fields, a n bit message field indicating whether the message comprises command or status information, a k bit description field specifying the command or status, and a j bit checksum field.) If the detected problem is a voltage level that is out of range, a record is written to log file 505, the record comprising: a text identifier of the type of problem (e.g. "out of range voltage"); identification of the particular board; the time; and descriptive text indicating whether the voltage was above, or below, the required range. After step 320, execution proceeds back to step 305 to continue monitoring of the board. With respect to this continued monitoring after a problem was detected, step 325 has been added. If in step 310 a problem is no longer detected, execution proceeds to step 325, where controller 120 checks if a problem was previously detected. (Obviously, suitable state variables (not shown) are set and/or cleared to track this condition. The use of variables to store state information is a known programming technique and not described herein.) If no problem was previously detected execution proceeds to step 305. On the other hand if a problem was previously detected, execution proceeds to step 320, where an indicator that the problem was seemingly corrected is written to log file 505. Since data regarding the health of server 5 is available in log file 505, this data is subsequently accessed by a user from console 520. Similarly, step 330 has been added to keep fault messages from flooding log file 505.

Figure 7:
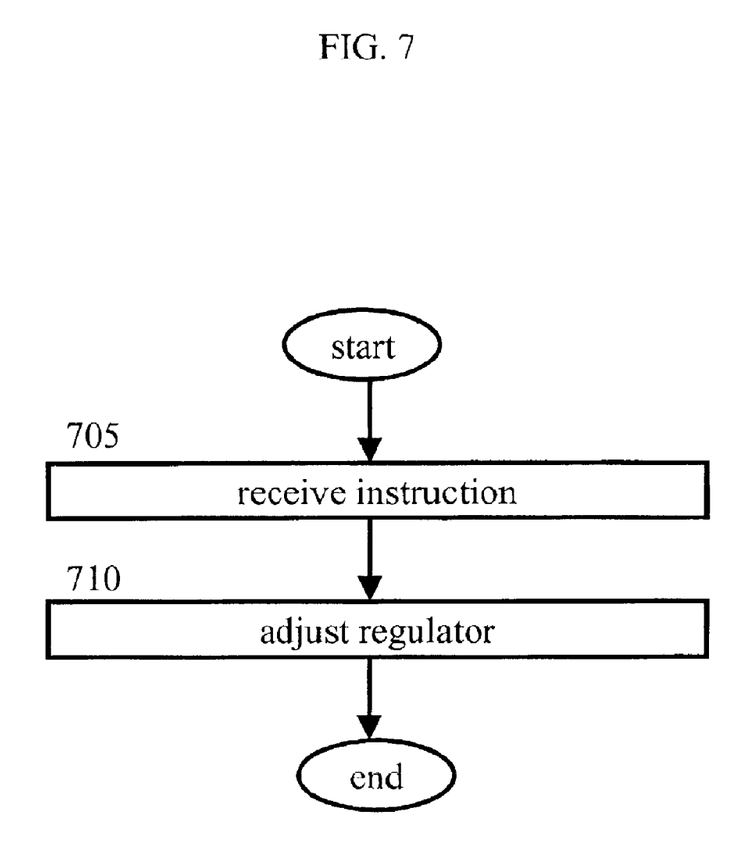
FIG. 7 shows another illustrative flow chart in accordance with the principles of the invention.

Indeed, the user from console 520 can also, in accordance with the principles of the invention, test server 5 by, e.g., (a) individually varying the voltage on a particular one of those boards supporting distributed power control, and (b) then performing fault diagnostics to examine its effect on the particular board. In this regard, a controller of a board supporting distributing power control (as represented by controller 120 of FIG. 2) receives instructions via the above-mentioned I²C signaling interface. Such a testing method is illustrated by the flow chart of FIG. 7. In step 705, controller 120 receives an instruction (e.g., via console 520 of FIG. 5), where the instruction specifies a particular change to voltage regulator 110. In response, controller 120 adjusts voltage regulator 110 in step 710. Thus, it is possible to run particular tests under different power conditions for those boards of a computer system that support distributed power control.

It should be noted that with the ability for a board supporting distributed power control (e.g., board 200 of FIG. 2) to exchange messages, e.g., via system maintenance bus 7, a shut down of a board can either be sudden and/or graceful. For example, returning for the moment to step 355 of FIG. 4, controller 120 first signals server 5, via the system maintenance bus 7, that board 200 is going to be shutdown and that board 200 should gracefully exit the execution of any pending programs. Either (a) upon receipt from server 5, via system maintenance bus 7, that board 200 has stopped execution, or (b) the passage of a predefined period of time (i.e., a time-out), controller 120 then may or may not (based on system requirements) perform the shut down of voltage regulator 110.

In addition to those described above, other types of problem detection (or exception handling)—as represented by steps 310 and 350 of FIG. 4—can occur in accordance with the inventive concept. For example, consider the following. The controller (e.g., controller 120 of FIG. 2) maintains its own history, or data, file. This allows controller 120 to perform time-based analysis of data before (or in addition to) any instantaneous exception reporting. For example, if there is access to temperature sensor data either via signaling path 112 or another signaling path, controller 120 forms an average temperature by accumulating individual temperature value readings over a predefined period of time for storage in memory 185. When this average temperature exceeds a predefined value, controller 120 writes data to a log file (such as log file 505) and/or causes a system alarm to be generated thus, perhaps, predicting the occurrence of a potential problem (e.g., before the board actually fails). Indeed, controller 120 can also shut the board off by disabling voltage regulator 110 as is illustrated by step 355 in the flow chart of FIG. 4.

As another example, the controller performs current shifting analysis, i.e., it tracks current data for the board over time. If the current data begins to increase, this could be suggestive of a pending failure and, in a similar fashion to the above-described shutdown of the board for a temperature failure, shuts down the board when the current exceeds a predefined threshold and/or logs the error to the computer system and/or generates an alert.

Figure 8:
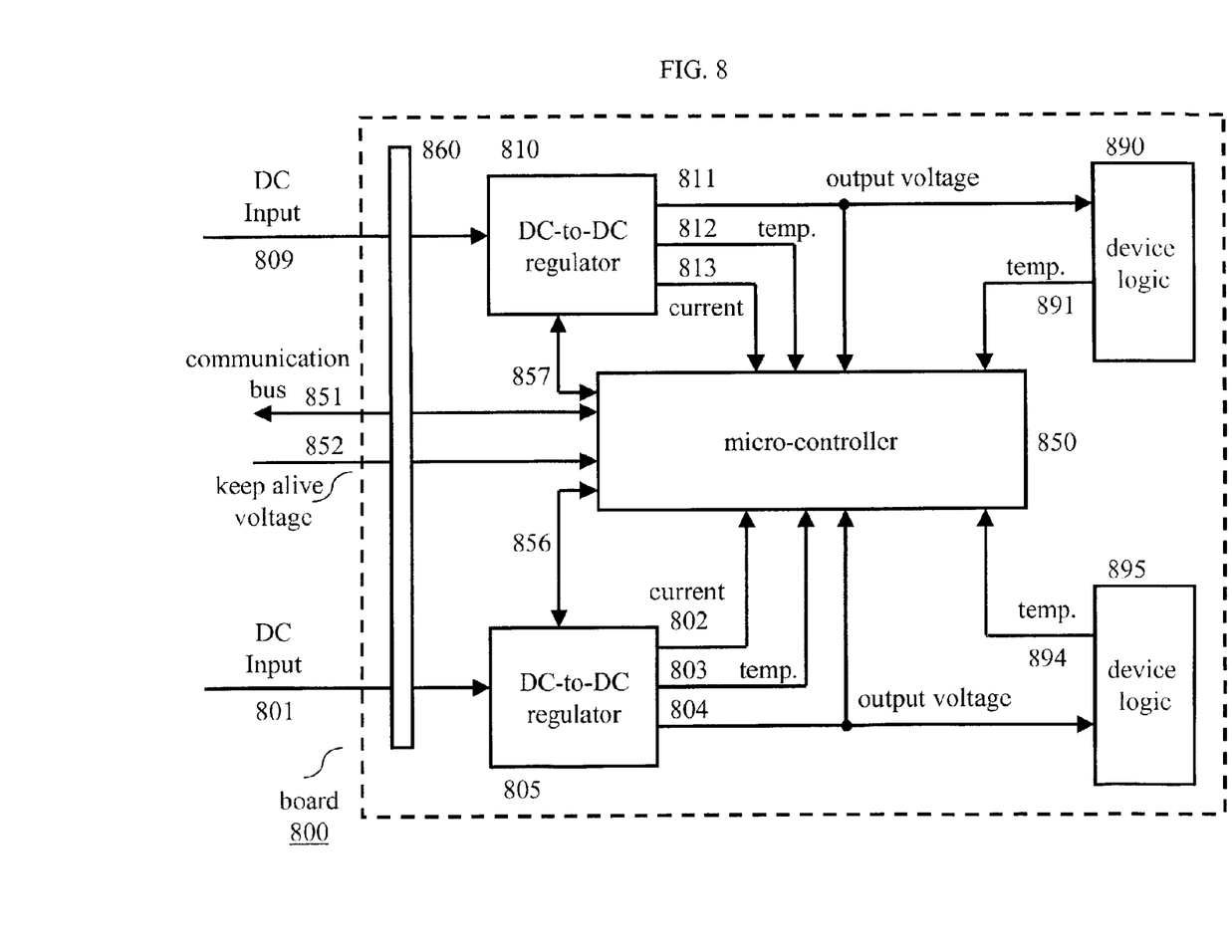
FIGS. 8 and 9 show other illustrative embodiments of the invention.
Figure 9:
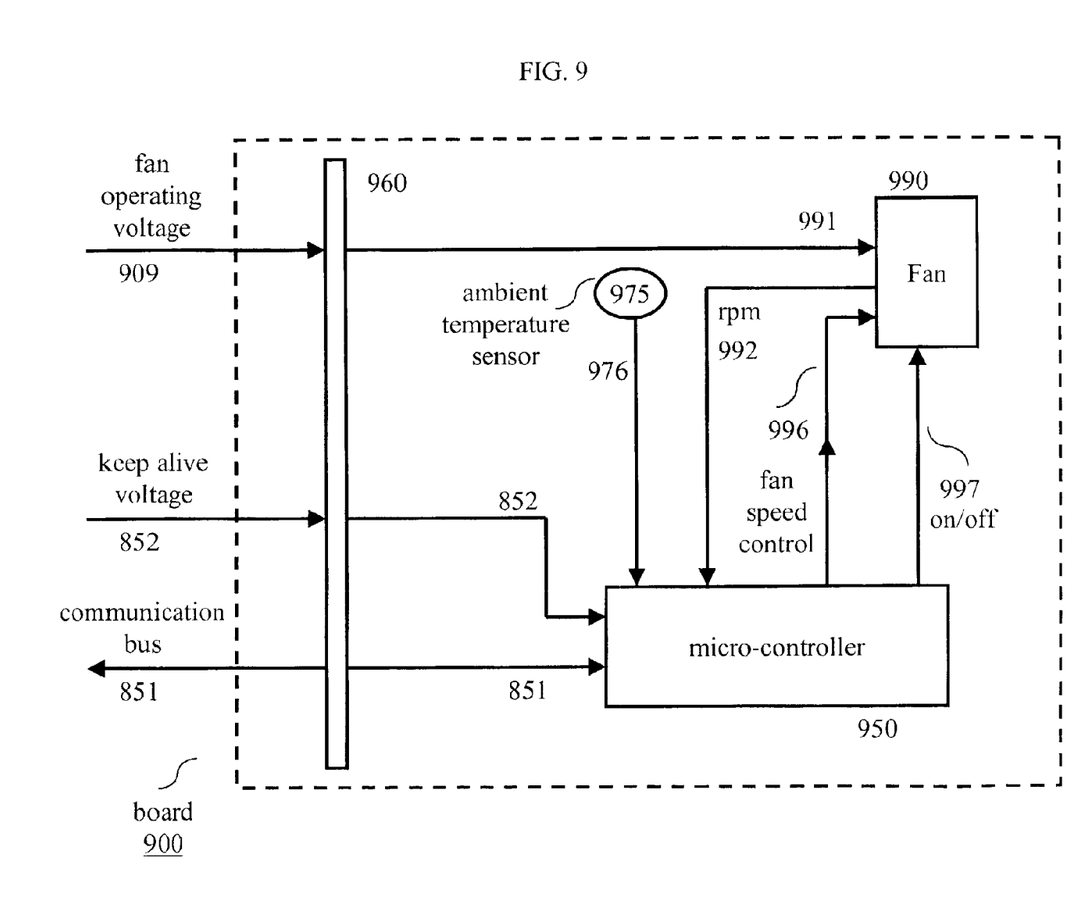

Other illustrative embodiments of the invention for use, e.g., in server 5 of FIG. 1, are shown in FIGS. 8 and 9. Other than the inventive concept, the elements shown in these figures are well known and not described in detail. In FIG. 8, a board 800 comprises a power control element as represented by micro-controller 850 and DC-to-DC regulators (or converters) 810 and 805. Board 800 interfaces to the remainder of the system via hot plug control circuit 860 (which, as known in the art, provides the ability to insert and remove board 800 without turning off power to other parts of the system). (It should be noted that the ability to hot plug a board can also be used on the illustrative embodiments shown in FIG. 2.) Micro-controller 850 is illustratively the PIC16LC774 available from Microchip. DC-to DC regulator 805 receives a DC input voltage 801 (e.g., from power supply 10 of FIG. 1) and provides a DC output voltage to device logic 895. Similarly, DC-to DC regulator 815 receives a DC input voltage 809 (e.g., from power supply 10 of FIG. 1) and provides a DC output voltage to device logic 890. Device logic 890 and device logic 895 represent the circuitry on the remainder of board 800 to which power is supplied by the DC-to-DC regulators 805 and 810. As can be observed from FIG. 8, micro-controller 850 monitors a number of power-related parameters. In particular, the output voltage from each DC-to-DC regulator via signal paths 811 and 804, temperature from each DC-to-DC regulator via signal paths 812 and 803, and temperature from two different areas of the aboard, as associated with device logic 890 and device logic 895, via signals 891 and 894. With respect to the temperature monitoring it is assumed that each DC-to-DC regulator provides this feature and that temperature-sensing circuitry (not shown) is included within device logic 890 and device logic 895. In accordance with any of the above-described flow charts of FIGS. 3, 4, 6 and 7, micro-controller 850 controls each DC-to-DC regulator via signal paths 856 and 857 and provides information to, and receives information from, communications bus 851 (e.g., the above-described system maintenance bus 7 of FIGS. 1 and 5). Keep alive power is provided to micro-controller 850 via signal path 852.

Turning now to FIG. 9, a board 900 comprises a power control element as represented by micro-controller 950. Micro-controller 950 is illustratively the PIC16LC774 available from Microchip. Board 900 interfaces to the remainder of the system via hot plug control circuit 960. Board 900 represents a fan control board and comprises an interface to a fan as represented by fan 990, to which power is supplied via signal path 909. In addition, board 900 provides an ambient temperature sensor 975. As can be observed from FIG. 9, micro-controller 950 monitors ambient temperature sensor 975 via signal path 976 and a revolutions-per-minute (rpm) signal from fan 990, via signal path 992. In accordance with any of the above-described flow charts of FIGS. 3, 4, 6 and 7, micro-controller 950 controls fan 990 either to change the rpm value, via signal path 996, and/or shutdown fan 990, via signal path 997. In addition, micro-controller 950 provides information to, and receives information from, communications bus 851 (e.g., the above-described system maintenance bus 7 of FIGS. 1 and 5). Keep alive power is provided to micro-controller 950 via signal path 852.

Figure 10:
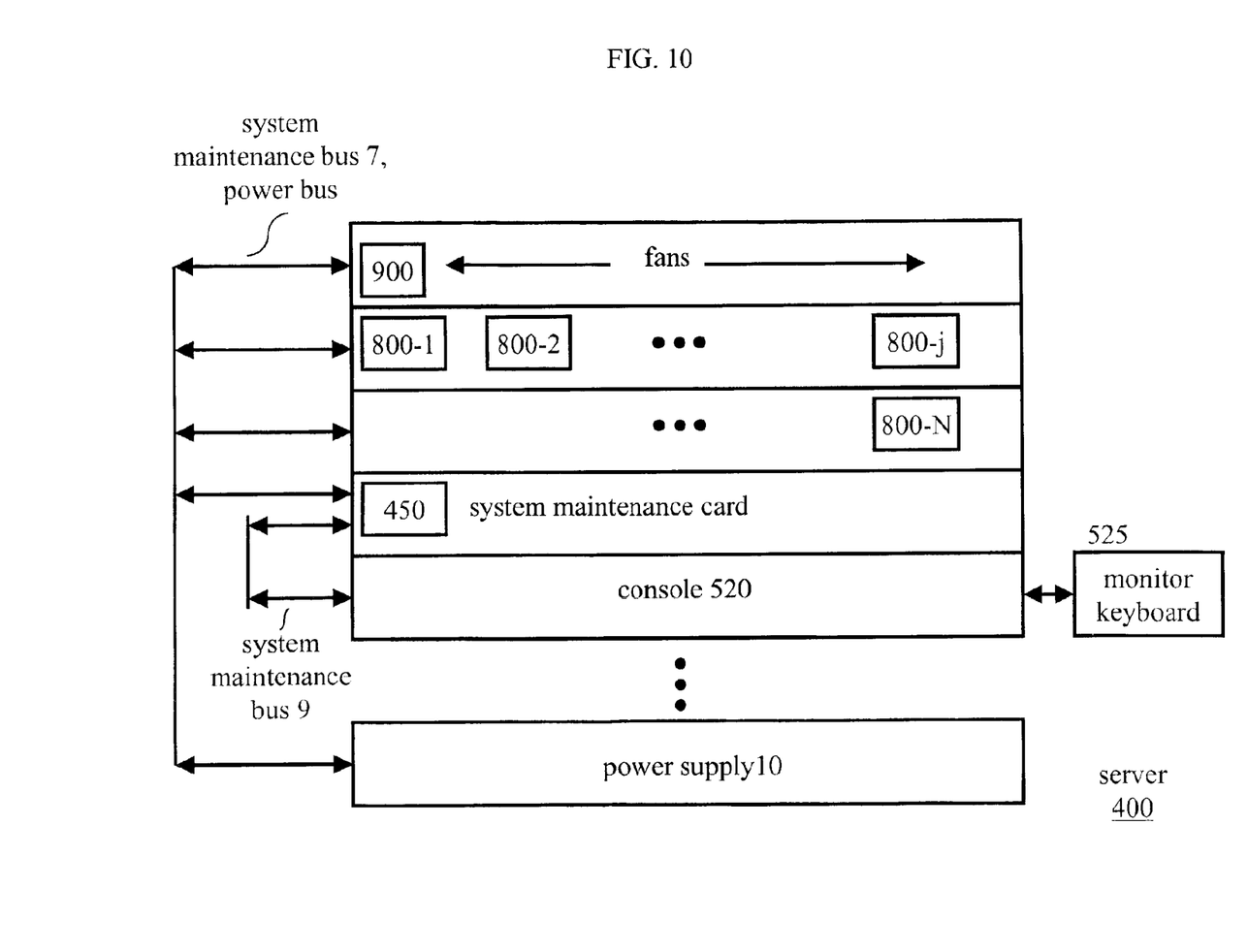
FIG. 10 shows a server arrangement in accordance with the principles of the invention.

Another server arrangement in accordance with the principles of the invention is shown in FIG. 10. As before, the elements shown in FIG. 10, other than the inventive concept, are well known and not described in detail. Server 400 comprises a number of racks of equipment (only those relevant to the invention are shown). Like numbers indicate like elements described earlier. The top rack is an array of fans controlled by, e.g., board 900 of FIG. 9. The next two racks are arrays of boards 800-1 through 800-N, all of which support distributed power control as described above, and which are represented by board 800 of FIG. 8. One rack comprises a system maintenance card 450 (described further below). Another rack comprises console 520 (i.e., the person computer functionality is integrated into server 400). Console 520 interfaces to a separate monitor, keyboard and mouse 525. The last rack, represented by power supply 10, provides power to server 400.

Figure 11:
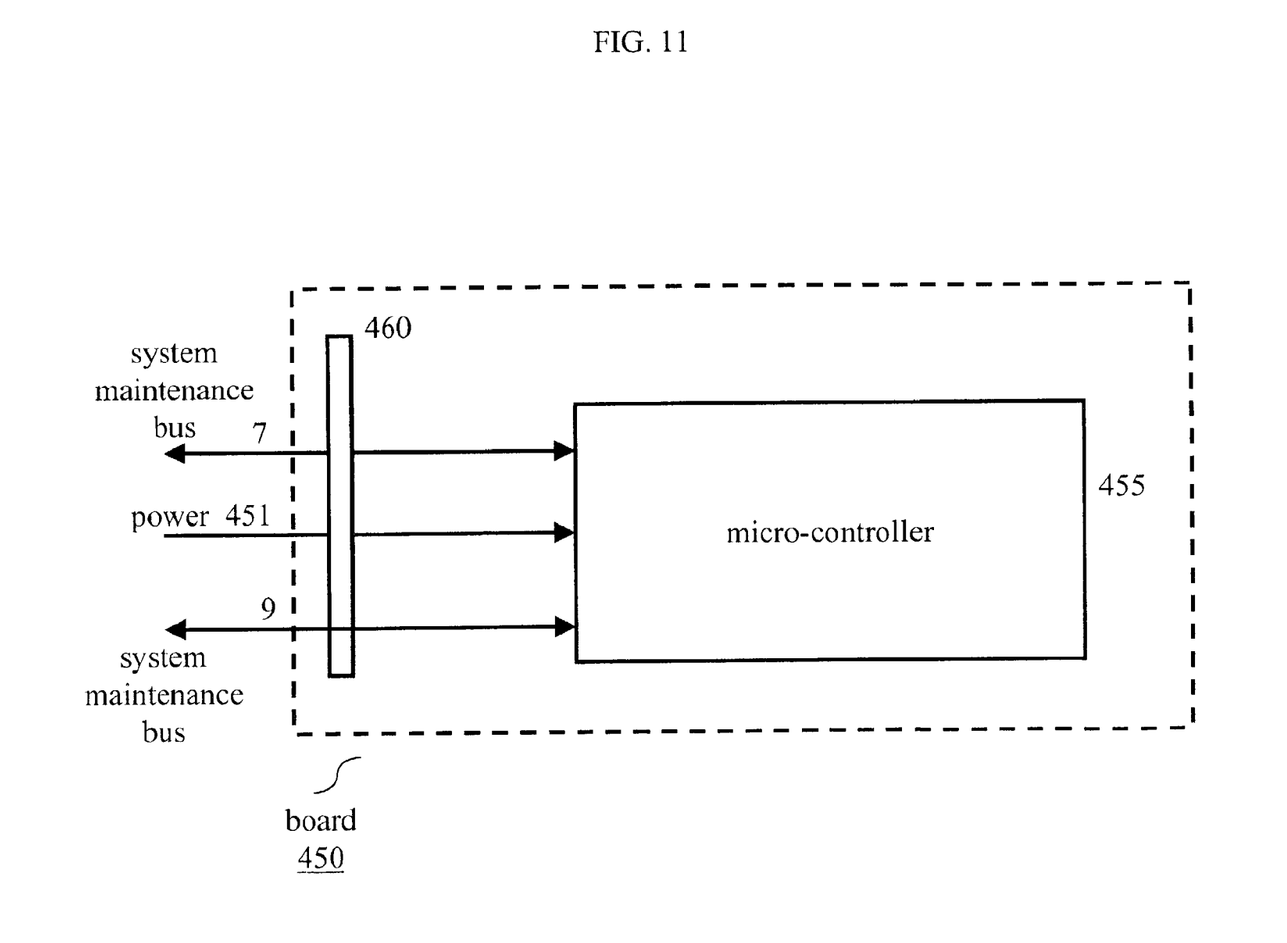
FIG. 11 shows another illustrative board for use in the server of FIG. 10.

Server 400 provides for distributed power control of boards 800-1, . . . , 800-N and board 900, as described above. One variation illustrated by server 400 is the inclusion of a system maintenance card 450, which also provides the port 510 functionality described above. System maintenance card 45 serves as a master power controller for the system and controls, e.g., boards 800-1, . . . , 800-N and board 900 via system maintenance bus 7 using the above-mentioned I²C signaling. System maintenance card 450 also provides the interface to console 520 via system maintenance bus 9 (also using but not limited to, illustratively, JTAG signaling). An illustrative embodiment of system maintenance card 450 is shown in FIG. 11. System maintenance card 450 comprises hot plug control circuit 460 and micro-controller 455, which receives power via signal path 451 and is coupled to system maintenance bus 7 and system maintenance bus 9. Micro-controller 455 is a stored-program based processor and memory such as the Vitesse VSC215. System maintenance card 450 provides a central interface point between console 520 and server 400. The inclusion of system maintenance card 450 provides the ability to also implement the flow charts represented by FIGS. 3, 4, 6 and 7 directly on system maintenance card 450. Thus, system maintenance card 450 can receive information on a power-related parameter from a board, e.g., board 800-1, and, if necessary, instruct the power control element of board 800-1 to adjust the regulator, or, perhaps, shut the board down. Conversely, system maintenance card 450 passes along board-specific information to console 520 for inclusion in, e.g., the above-mentioned log file, and also passes along maintenance instructions from console 520 to other parts of the server.

As described above, the inventive concept provides a scaleable power solution. Indeed, the inventive concept provides the ability for a system, such as a multi-processor computer system, to monitor and adjust power-related parameters—on a per board basis. For example, the inventive concept provides, and is not limited to, the ability to monitor voltages, voltage margins, temperature, and/or current; the ability to predict faults; and the ability to perform fault isolation (e.g., by shutting down a board).

The foregoing merely illustrates the principles of the invention and it will thus be appreciated that those skilled in the art will be able to devise numerous alternative arrangements which, although not explicitly described herein, embody the principles of the invention and are within its spirit and scope. For example, consider the following. Although the inventive concept was described in the context of a server having N boards, the server is not limited to only N boards; and it is not required that every board in the server incorporate the invention. Similarly, although the inventive concept was described in the context of a signaling path that conveyed power to a board and a signaling path that conveyed power to a power control element of the board, fewer, or more, signaling paths may be used. Also, for simplicity the distributed power control was described in the context of a voltage source—it should be realized that the inventive concept also applies to, e.g., a current source. In addition, this signaling used, e.g., I²C and JTAG, were merely illustratively and other types of signaling can be used.

What is claimed is:

1. A computer system comprising:
   a power supply for providing a voltage;
   at least two boards, each board receiving the voltage, and wherein each board comprises
   at least one voltage regulator, for receiving the voltage and for providing a regulated voltage level to the board, and
   at least one processor for controlling the regulated voltage level,
   wherein the processor monitors a value of at least one power-related parameter on the board and controls the voltage regulator in such a way as to influence a subsequent value of the at least one parameter.

2. The computer system of claim 1 wherein the processor, upon detection of a fault associated with the at least one power related parameter, shuts down the board.

3. The computer system of claim 1 wherein the at least one power-related parameter is a regulated voltage of the board.

4. The computer system of claim 3 wherein the processor collects temperature values over time for performing a time-based analysis of the collected temperature values.

5. The computer system of claim 1 wherein the at least one power-related parameter is a temperature value of the board.

6. The computer system of claim 1 wherein each board further comprises a signaling interface for receiving instructions therefrom, and wherein, the processor is responsive to the received instructions for controlling the at least one voltage regulator.

7. The computer system of claim 6 wherein the processor causes data to be written to a system log file, wherein the data is associated with the at least one power-related parameter.

8. The computer system of claim 1 further comprising an interface for coupling to a console for receiving instructions therefrom for controlling various ones of the processors on each of the at least two boards.

9. A computer system comprising:
- a plurality of boards, each board comprising a power control element, wherein the power control element comprises a regulator for providing a regulated voltage to the board and a processor for monitoring and controlling the regulator; and
- a signaling interface coupled to each power control element of each of the plurality of boards for communicating data to, and from, each one of the processors,
- wherein the processor for each board monitors a value of at least one power-related parameter for its board and controls its regulator in such a way as to influence a subsequent value of the at least one parameter.

10. The computer system of claim 9 wherein the processor for each board, upon detection of a fault associated with the at least one power related parameter, shuts down its board.

11. The computer system of claim 9 wherein the at least one power-related parameter is a regulated voltage of the board.

12. The computer system of claim 9 wherein the at least one power-related parameter is a temperature value of the board.

13. The computer system of claim 9 wherein the processor for each board is responsive to instructions received from the signaling interface for controlling its regulator.

14. The computer system of claim 9 wherein the processor for each board causes data to be written to a system log file via the signaling interface and wherein the data is associated with the at least one power-related parameter of its board.

15. The computer system of claim 9 further comprising an interface for coupling to a console for receiving instructions therefrom for controlling various ones of the processors on each board.

16. The computer system of claim 9 further comprising a central controller coupled to the signaling interface for controlling the processor on each of the plurality of boards.

17. The computer system of claim 16 wherein the central controller causes data to be written to a log file representative of information received, via the signaling interface, with respect to at least one power-related parameter of one of the plurality of boards.

18. The computer system of claim 16 further comprising an interface for coupling the central controller to a console for receiving instructions therefrom for controlling various ones of the processors on each board.

* * * * *